Dec. 28, 1965   H. M. GEYER   3,225,626
ELECTROMECHANICAL ACTUATOR SYSTEMS
Filed May 22, 1963   4 Sheets-Sheet 1

INVENTOR.
HOWARD M. GEYER
BY
HIS ATTORNEY

Dec. 28, 1965    H. M. GEYER    3,225,626
ELECTROMECHANICAL ACTUATOR SYSTEMS
Filed May 22, 1963    4 Sheets-Sheet 2

INVENTOR.
HOWARD M. GEYER
BY
W. F. Finker
HIS ATTORNEY

Dec. 28, 1965          H. M. GEYER          3,225,626

ELECTROMECHANICAL ACTUATOR SYSTEMS

Filed May 22, 1963          4 Sheets-Sheet 4

INVENTOR.
HOWARD M. GEYER
BY
HIS ATTORNEY

United States Patent Office 3,225,626
Patented Dec. 28, 1965

3,225,626
ELECTROMECHANICAL ACTUATOR SYSTEMS
Howard M. Geyer, Dayton, Ohio, assignor to General Motors Corporation, Detroit, Mich., a corporation of Delaware
Filed May 22, 1963, Ser. No. 282,272
16 Claims. (Cl. 74—661)

This invention pertains to electromechanical actuators, and particularly to electromechanical actuators designed for handling high mass loads.

Heretofore, electromechanical aircraft actuators comprising a relatively high speed motor, a planetary gear reduction unit and a ball screw and nut assembly, which can be made relatively light in weight, have been used for operating aircraft cargo doors, landing gears, etc. The load imposed in these aircraft applications is a force load created by air or springs. On the other hand, in commercial actuator applications, the load is made up of dead weight, and on a weight loaded actuator the energy required to raise the weight must be absorbed when the weight is lowered. In other words, the energy stored in weight loaded actuators must be dissipated, and experience has shown that one of the most satisfactory ways of handling this type of mechanism is through an irreversible mechanism such as a low lead Acme screw or a worm gear train. However, one of the drawbacks of either of the latter types is that the high power required to raise the load prohibits its use in aircraft due to the inefficiency of the drive train.

The present invention relates to electromechanical actuator systems embodying the best features of both aircraft and commercial actuators for raising and lowering high inertia loads, such as those required for cargo loading and missile launching, wherein a high efficiency drive is utilized for raising the load and a low efficiency drive is used for lowering the load. Accordingly, among my objects are the provision of an electromechanical actuator for high mass loads including separate drives for raising and lowering the load; the further provision of an electromechanical actuator of the aforesaid type including a high efficiency drive for raising a high mass load and a low efficiency drive for lowering the load; the further provision of an electromechanical actuator system of the aforesaid type including separate motors for raising and lowering a high mass load; and the still further provision of an electromechanical actuator system of the aforesaid type including a single motor for raising and lowering a high mass load through different drive paths.

The aforementioned and other objects are accomplished in the present invention by utilizing a high efficiency planetary gear train in the drive path for raising the high mass load, and a relatively low efficiency worm drive in the path for lowering the high mass load. Specifically, four embodiments of the improved electromechanical actuator system are disclosed wherein two embodiments utilize separate motors for raising and lowering the load, and the preferred embodiments utilize only a single motor to both raise and lower the load through separate drive paths. The several embodiments of electromechanical actuator systems disclosed herein comprise combinations of brakes, clutches and roller types of free wheeling devices which facilitate the use of two different gear trains, or drive paths.

Further objects and advantages of the present invention will be apparent from the following description, reference being had to the accompanying drawings, wherein preferred forms of the present invention are clearly shown.

Figure 1:
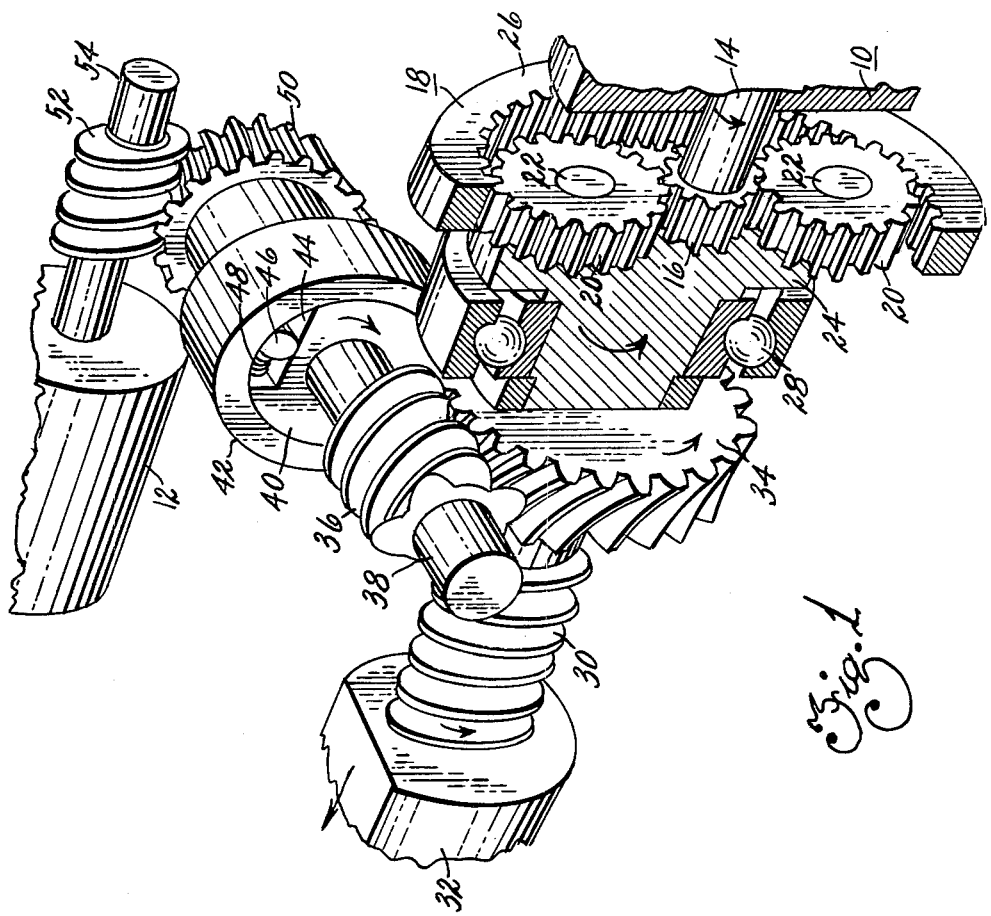
FIGURE 1 is a fragmentary perspective view, partly in section and partly in elevation, depicting one embodiment of an electromechanical actuator for a high mass load utilizing two motors.

With reference to FIGURE 1, an electromechanical actuator system is disclosed comprising a pair of unidirectional electric motors 10 and 12, the motor 10 being utilized to raise a high mass load, and the motor 12 being used to lower the load. The motor 10 includes a shaft 14 drivingly connected to a sun gear 16 of a highly efficient planetary gear set 18. The planetary gear set 18 includes planet pinions 20 journalled on stub shafts 22 attached to a carrier 24, and a fixed ring gear 26. The carrier 24 is journalled by a thrust ball bearing assembly 28, and as shown, may be formed as an integral part of a reversible screw shaft 30 forming a component of a ball screw and nut assembly, including a nut 32 having threaded engagement with the screw shaft 30 through a plurality of circulating balls, not shown, such as is well known in the art. Since the nut 32 is restrained against rotation, rotation of the screw shaft will result in axial movement of the nut therealong in a direction dependent upon the direction of rotation of the screw shaft.

The direction of rotation of the motor shaft 14 for extending, or raising, the high mass load is indicated by arrows, from which it is seen that the shaft 14 rotates in a counterclockwise direction as do the carrier 24 and the screw shaft 30. The screw shaft 30 has a worm wheel 34 attached thereto that meshes with a transversely extending worm 36 constituting a reversible worm drive. The worm 36 is attached to a shaft 38 to which a cam 40 is secured. The cam is disposed within an annulus 42 and has a cutout 44 which, with the annulus 42, forms a cage for a roller 46 biased by a coil spring 48, this structure constituting an over-running clutch of the roller and spring type. During extending movement of the actuator, the worm shaft 38 and the cam 40 are rotated in the clockwise direction thereby releasing the clutch such that the annulus 42 remains stationary. The annulus 42 is connected to a second worm wheel 50 meshing with a worm 52 attached to a shaft 54 of the motor 12, constituting an irreversible worm drive for retracting the actuator with an aiding, or compression, load.

It will be apparent that when the motor 10 is energized to extend the load, the screw shaft 30 will be driven in one direction, and that the drive is highly efficient, being of the planetary gear type, whereas when the motor 12 is energized the screw shaft 30 will be rotated in the opposite direction to retract the load through the low efficiency worm gearing and the one-way over-running clutch. The load acting on the nut is a compression load and comprises a dead weight.

Figure 2:
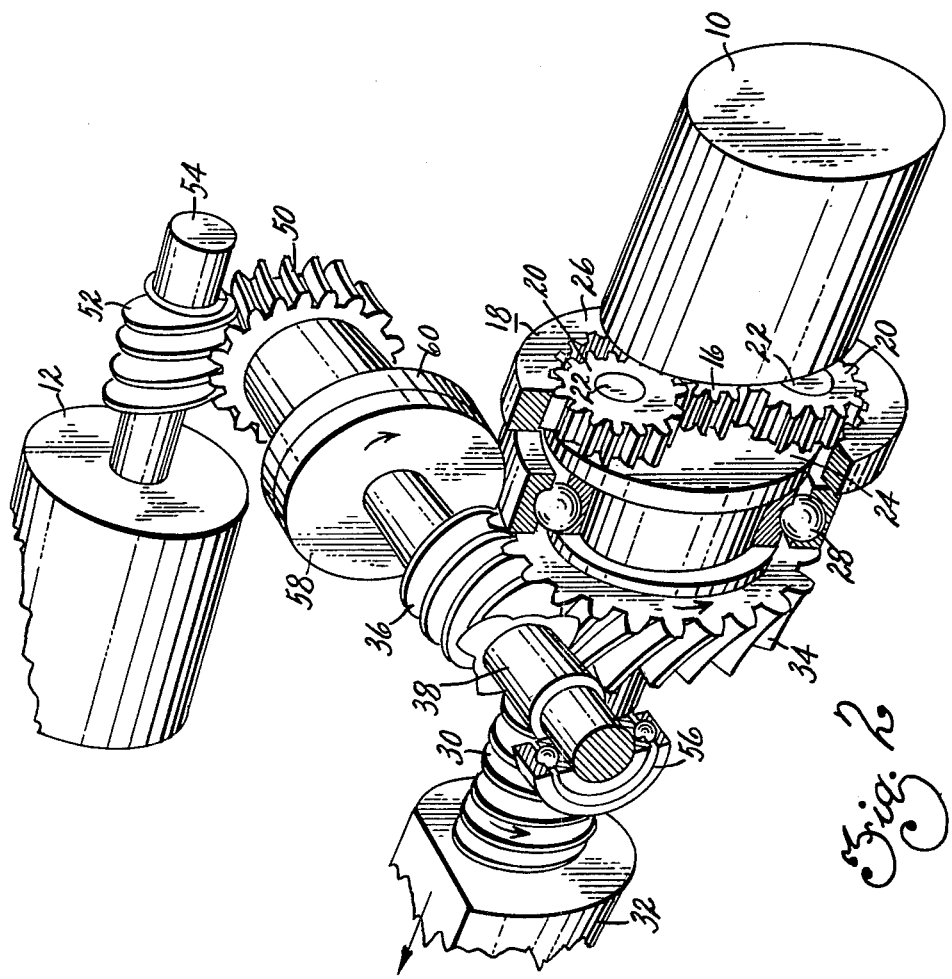
FIGURE 2 is a fragmentary perspective view, partly in section and partly in elevation, of a second embodiment utilizing two motors.

Referring to FIGURE 2, a second embodiment of a dual motor electromechanical acuator system is disclosed, similar numbers referring to similar parts previously described in connection with the embodiment of FIGURE 1. Thus, in the second embodiment the electric motor 10 is connected to the screw shaft 30 through planetary gear set 18 for raising, or extending, the load attached to the nut 32. However, in this embodiment the worm shaft 38, which is journalled by thrust ball bearing assembly 56 has a friction clutch disc 58 attached thereto in engagement with a second friction clutch disc 60 secured to the shaft of the worm wheel 50 of the irreversible worm drive. When the motor 10 is driving the screw shaft in the counterclockwise direction to extend the actuator, as indicated by the arrows, the worm 36 engaging the worm wheel 34 of the reversible worm drive acts like a rack and tends to separate the clutch discs 58 and 60 so as to interrupt the driving connection therebetween. However, when the motor 12 is energized to retract the load through worm 52 and worm wheel 50, the torque being less than the torque required to slip the clutch discs, the clutch discs 58 and 60 will be held in engagement due to the compression load which causes the worm 36 to operate as a rack applying force to the clutch plates proportional to the load on the actuator thereby enabling rotation to be imparted to the screw shaft 30 in the direction opposite the direction indicated by the arrows. The irreversible worm gear drive must, under these conditions, absorb the energy of the load and the gear function.

In both of the two motor electromechanical actuator system embodiments of FIGURE 1 and 2, dual drive paths are provided for raising and lowering a high mass load, namely a high efficiency planetary gear drive for raising the load and a low efficiency worm drive for lowering the load. Moreover, since the load is dead weight and acting in compression, the retract motor can be relatively small since it need only supply the power to rotate the reversible worm drive and thus control the rate of lowering, or retraction.

Figure 3:
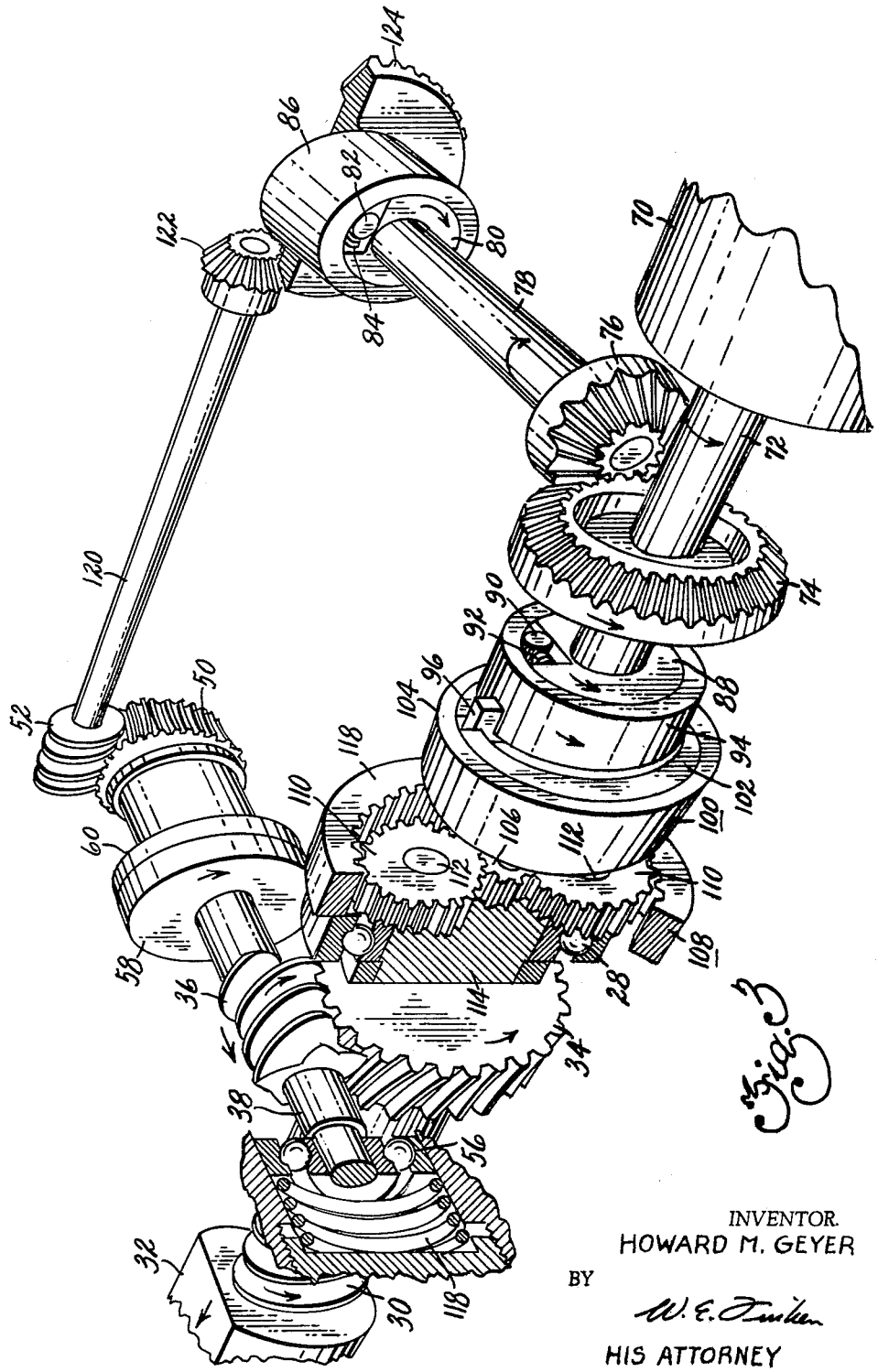
FIGURE 3 is a fragmentary perspective view, partly in elevation and partly in section, depicting a third embodiment utilizing a single motor.

With reference to FIGURE 3, an electromechanical actuator system having dual drive paths and employing only a single motor is disclosed. In this system, a reversible electric motor 70 has its shaft 72 attached to a bevel gear 74 which meshes with a second bevel gear 76 attached to a shaft 78 and carrying a cam 80 for a one-way over-running clutch comprising a roller 82, a spring 84 and an annulus 86. The shaft 72 is connected to a cam 88 of a second one-way over-running clutch comprising a roller 90, a spring 92 and an annulus 94. The annulus 94 is formed with a radial extending tang 96 constituting a driver for a centrifugal clutch assembly 100 of the type disclosed in Light Patent 2,747,713 which includes a split sleeve 102 and an annular housing 104.

The housing 104 is drivingly connected to a sun gear 106 of a planetary gear set 108 having planet pinions 110 journalled on shafts 112 attached to a carrier 114, and a fixed ring gear 118. The carrier 114 may be integral with the screw shaft 30 and is rotatably supported by a thrust ball bearing assembly 28. The screw shaft 30 forms a component of a ball screw and nut assembly including a nut 32 which is threadedly connected with the shaft through a plurality of circulating balls, not shown.

A worm wheel 34 is attached to the screw shaft 30, this worm wheel 34 meshing with a worm 36 attached to a worm shaft 38 journalled by a thrust bearing 56. The worm wheel 34 and worm 36 constitute a reversible worm drive. As in the embodiment shown in FIGURE 2, the worm shaft 38 is connected to a clutch plate 58 engageable with a second clutch plate 60 connected to the worm wheel 50 that meshes with worm 52, the worm wheel 50 and worm 52 being irreversible, or self-locking. In addition, the worm shaft and friction clutch plates 58 and 60 are preloaded by a spring 118. The spring 118 maintains the clutch plates in contact and thus permits the actuator to be positively retracted even under a no load condition by the motor.

The worm 52 is attached to a shaft 120 having a bevel gear 122 meshed with a bevel gear 124 attached to the clutch housing 86. When the motor 70 drives the shaft 72 in the counterclockwise direction as indicated by the arrows in FIGURE 3, the roller clutch 82 associated with the bevel gear 124 is disengaged whereas the roller clutch 90 associated with the centrifugal clutch 100 is engaged thus rotating the screw shaft through the efficient planetary gear set to extend the actuator. At this time the worm 36 acts as a rack to relieve the preload of spring 118 on the clutch plates 58 and 60 so that no movement is imparted to the worm wheel 50 and worm 50.

When the motor 70 is rotated in the reverse direction, the roller clutch 82 drives its housing 86, and hence rotation is imparted to the screw shaft in the reverse direction through bevel gear 124 and 122, irreversible worm drive 52 and 50, the clutch plates 58 and 60 which are held in engagement by the preloaded spring 180 and the rack effect of the worm 36. During reverse rotation the centrifugal clutch 100 is disengaged, and the roller clutch 90 is free-wheeling.

Figure 4:
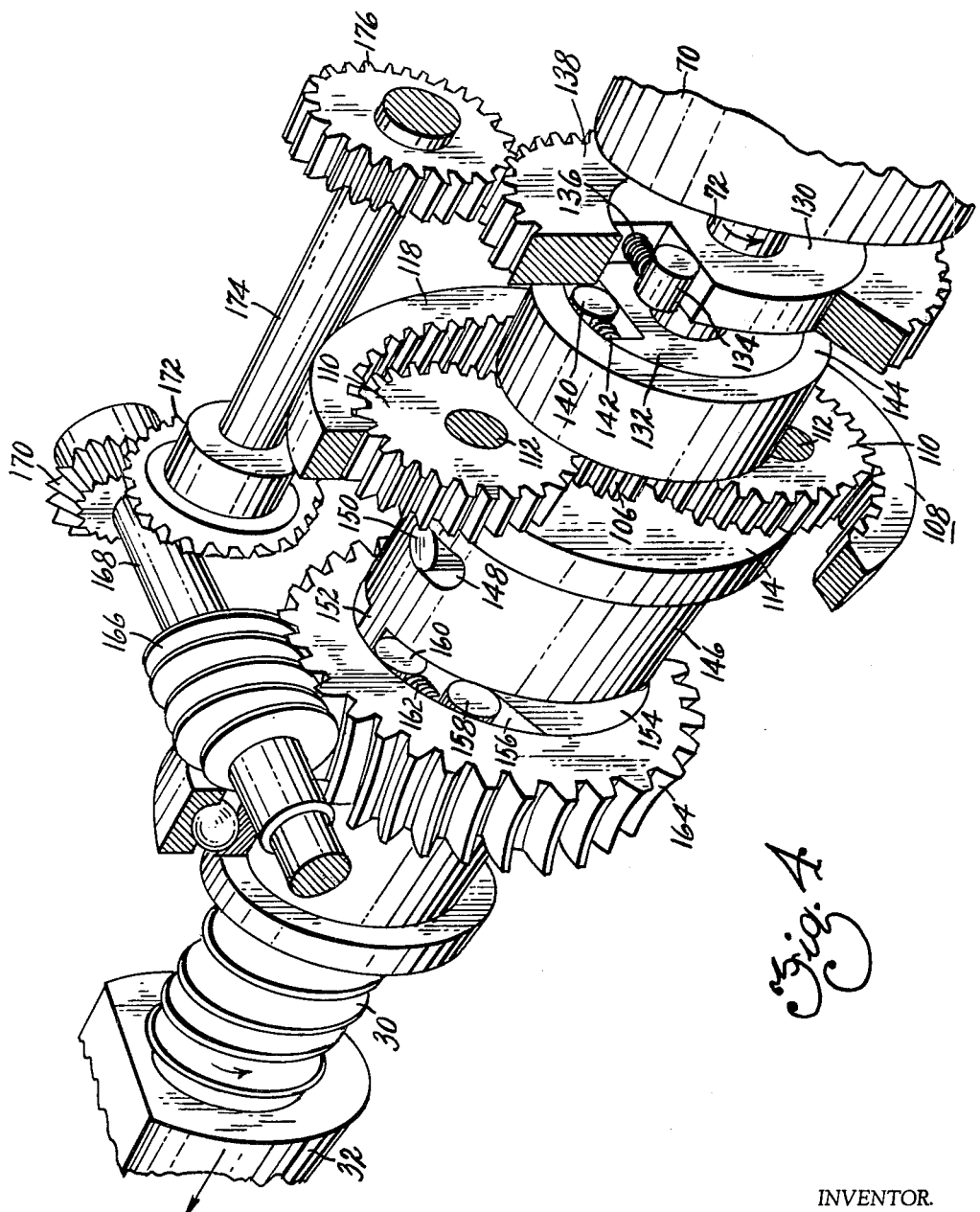
FIGURE 4 is a fragmentary perspective view, partly in section and partly in elevation, of the preferred electromechanical actuator embodying a single motor for raising and lowering a high mass load through different gear trains.

Referring to FIGURE 4 the preferred embodiment of the electromechanical actuator system embodying dual drive paths will be described, similar reference numerals referring to similar parts previously described in connection with the embodiment shown in FIGURE 3. In this embodiment the motor 70 is connected to a pair of over-running, one-way clutch cams 130 and 132. The cam 130 coacts with a roller 134 having a spring 136 and a housing 138. The cam 132 coacts with a roller 140 biased by a spring 142 and having a housing 144 attached to the sun gear 106 of the planetary gear set 108. In this embodiment the carrier, or spider, 114 is not integral with the screw shaft 30, but on the other hand, is formed with a skirt 146 having an elongate, peripheral, arcuate slot 148 therein receiving a pin 150 attached to the screw shaft 30. The skirt 146 is formed with an axially extending brake released tang 152 constituting a component of a roller no-back, or double acting brake, including a cam 154 attached to the screw shaft having a flat 156 with a pair of spaced rollers 158 and 160 biased apart by a coil spring 162. The rollers coact with the rim of worm wheel 164 that meshes with worm 166, the worm and worm wheel being irreversible. The worm is attached to a worm shaft 168 connected by bevel gears 170 and 172 with a shaft 174 having a spur gear 176 meshing with the gear 138.

When the motor shaft 72 is rotated in the counterclockwise direction as indicated in FIGURE 4, the roller clutch 134 is released while the roller clutch 140 is engaged so as to rotate the screw shaft 30 through the high efficient planetary gear set which is then driven through the drive pin 150 on the skirt 146. At this time the drive roller 160 is released so that the worm gear 164 remains stationary.

When the direction of rotation of the motor is reversed, the roller clutch 134 is engaged while the roller clutch 140 is released such that rotation is imparted to gear 176, and thence through shaft 174 and bevel gears 172 and 170 to the worm shaft 168. This will result in driving the screw shaft 30 in the clockwise direction through irreversible worms 166 and worm wheel 164 through the engaged retract drive roller 160 which controls the rate of actuator retraction and lowering of the high mass load in accordance with the speed of the motor. The load torque is not transmitted through the drive pin 150 during retraction, and the load carrying, or brake roller 158 is never released.

While the embodiments of the invention as herein disclosed constitute preferred forms, it is to be understood that other forms might be adopted.

What is claimed is as follows:

1. An electromechanical actuator system for high mass loads comprising, a screw and nut actuator and dual drive paths for extending and retracting said actuator, one of said drive paths including a high efficiency reduction unit operatively connected with said actuator and the other of said drive paths including a low efficiency irreversible reduction unit operatively connected with said actuator.

2. The electromechanical actuator system set forth in claim 1 wherein said high efficiency unit comprises a planetary gear reduction.

3. The electromechanical actuator system set forth in claim 1 wherein said low efficiency unit comprises an irreversible worm drive reduction.

4. The electromechanical actuator system set forth in claim 1 wherein said high efficiency unit comprises a planetary gear reduction, and wherein said low efficiency unit comprises an irreversible worm drive reduction.

5. An electromechanical actuator system for high mass loads comprising, a screw and nut actuator including a rotatable screw shaft and an axially movable non-rotatable nut, electric motor means for rotating said screw shaft in opposite directions to extend and retract said actuator, and separate drive paths operatively interconnecting said electric motor means and said screw shaft for extending and retracting said actuator, said separate drive paths including a high efficiency reduction unit operatively connected with said screw shaft for extending said actuator and a low efficiency reduction irreversible unit operatively connected with said screw shaft for retracting said actuator.

6. The electromechanical actuator system set forth in claim 5 wherein said electric motor means comprises two unidirectional electric motors.

7. The electromechanical actuator system set forth in claim 6 wherein said high efficiency reduction unit comprises a planetary gear set operatively connected between said screw shaft and one of said motors, and wherein said irreversible low efficiency reduction unit comprises a reversible worm and worm wheel drivingly connected with said screw shaft, an irreversible worm and worm wheel drivingly connected with the second motor and a one-way roller clutch operatively interconnecting said irreversible worm and worm wheel and said reversible worm and worm wheel such that said reversible worm and worm wheel free-wheels during extension of the actuator.

8. The system set forth in claim 6 wherein said high efficiency reduction unit comprises a planetary gear set operatively connected between one of said motors and said screw shaft, and wherein said low efficiency reduction unit comprises a reversible worm drivingly connected with said screw shaft, an irreversible worm drive connected with the second motor and a pair of friction clutch discs for drivingly connecting said reversible and irreversible worm drives when said second motor is energized to retract said actuator.

9. The system set forth in claim 8 wherein said reversible worm drive includes a worm wheel attached to said screw shaft, a worm meshing with said worm wheel and a worm shaft secured to said worm, said worm shaft being movable axially in opposite directions to engage and disengage said clutch discs.

10. The electromechanical actuator system set forth in claim 5 wherein said electric motor means comprises a reversible electric motor.

11. The system set forth in claim 10 wherein said high efficiency reduction unit comprises a planetary gear set connected to said screw shaft, the input to said planetary gear set comprising a centrifugally responsive clutch and a one-way roller clutch connected to said motor, and wherein said low efficiency reduction unit comprises a reversible worm drive operatively connected with said screw shaft, an irreversible worm drive, a friction clutch operative to connect and disconnect said irreversible and reversible worm drives and a one-way drive connection between said motor and said irreversible worm drive whereby rotation of said motor in one direction will extend said actuator and rotation of said motor in the opposite direction will retract said actuator.

12. The system set forth in claim 11 wherein said reversible worm drive comprises a worm wheel drivingly connected with said screw shaft, a worm meshing with said worm wheel and secured to a worm shaft, said friction clutch comprising a pair of discs, one of which is attached to said worm shaft and the other of which is drivingly connected to the worm drive, and wherein said worm shaft is axially movable and spring biased to normally engage said clutch discs, said clutch discs being separated through rack action of the worm on the worm wheel of the reversible worm drive during actuator extension and engaged during actuator retraction.

13. An electromechanical actuator system for high mass loads comprising, a screw and nut actuator including a rotatable screw shaft and a nonrotatable nut, a reversible electric motor for extending and retracting said actuator, and dual drive paths operatively interconnecting said motor and said screw shaft including a high efficiency drive path operatively connected with said screw shaft for extending said actuator and a low efficiency drive path operatively connected with said screw shaft for retracting said actuator, said high efficiency drive path comprising a one-way clutch, a planetary gear set and a roller no-back, said low efficiency drive path comprising a one-way clutch, an irreversible worm drive and said roller no-back.

14. The system set forth in claim 13 wherein said one-way clutches are of the roller type, and include coaxially arranged cams.

15. The system set forth in claim 13 wherein said roller no-back comprises a cam having a single flat thereon, a pair of rollers arranged on said flat and biased apart by spring means, an annulus coaxial with said cam and encompassing said rollers and said cam and a release tang, said release tang being integral with an annulus attached to the output of said planetary gear set and having an arcuate peripheral slot therein, and a drive pin attached to the screw shaft and extending through said slot whereby rotation of said motor in one direction will release said no-back to rotate the screw shaft in one direction through said drive pin, and rotation of the motor in the opposite direction will drive said screw shaft in the opposite direction through said irreversible worm drive with the no-back engaged.

16. The system set forth in claim 15 wherein one of the rollers of the no-back constitutes a drive roller which is released during actuator extension and engaged during actuator retraction, and the other roller comprises a braking roller which is always engaged.

References Cited by the Examiner

UNITED STATES PATENTS

| 990,999 | 5/1911 | McGuire et al. | 74—665.0 |
| 2,029,094 | 1/1936 | De Vlieg et al. | 74—665.0 |
| 2,933,937 | 4/1960 | Kron et al. | 74—424.8 |
| 2,562,568 | 7/1951 | Nordone | 74—810 |

DON A. WAITE, *Primary Examiner.*

L. H. GERIN, *Assistant Examiner.*